United States Patent
Kobayashi

(10) Patent No.: US 11,305,381 B2
(45) Date of Patent: Apr. 19, 2022

(54) WELDING METHOD

(71) Applicant: FUTABA INDUSTRIAL CO., LTD., Aichi (JP)

(72) Inventor: Toru Kobayashi, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 277 days.

(21) Appl. No.: 16/601,000

(22) Filed: Oct. 14, 2019

(65) Prior Publication Data

US 2020/0122270 A1 Apr. 23, 2020

(30) Foreign Application Priority Data

Oct. 19, 2018 (JP) .............................. JP2018-197703

(51) Int. Cl.
*B23K 26/244* (2014.01)
*B23K 26/02* (2014.01)
*B23K 103/10* (2006.01)

(52) U.S. Cl.
CPC ............ *B23K 26/244* (2015.10); *B23K 26/02* (2013.01); *B23K 2103/10* (2018.08)

(58) Field of Classification Search
CPC ................ B23K 26/28; B23K 26/0626; B23K 26/0876; B23K 26/0892; B23K 37/06; B23K 26/22; B23K 26/046; B23K 26/08; B23K 26/064; B23K 26/067; B23K 26/21; B23K 26/32; B23K 26/00; B23K 26/06; B23K 26/082; B23K 26/244; B23K 26/02; B23K 26/24; B23K 26/322; B23K 2101/34; B23K 2101/35; B23K 2103/04; B23K 2103/08

(Continued)

(56) References Cited

U.S. PATENT DOCUMENTS

2003/0168437 A1* 9/2003 Tanaka .............. H01L 21/02678
219/121.82
2003/0217993 A1 11/2003 Stol et al.
(Continued)

FOREIGN PATENT DOCUMENTS

JP 2005527383 A 9/2005
JP 2011173146 * 10/2011 ............. B23K 26/20

OTHER PUBLICATIONS

Machine Translation of JP 2011173146; Aug. 2021 (Year: 2021).*

*Primary Examiner* — Tu B Hoang
*Assistant Examiner* — Thomas J Ward
(74) *Attorney, Agent, or Firm* — David D. Brush; Westman, Champlin & Koehler, P.A.

(57) ABSTRACT

One aspect of the present disclosure is a welding method including welding an upper plate and a lower plate overlapped with the upper plate by irradiating a surface of the upper plate with a laser beam. The welding includes forming a main welding path that intersects a welding advancing direction and that includes turning points. The upper plate and the lower plate are arranged in an inclined manner with respect to a horizontal plane when viewed parallel to the welding advancing direction. In the forming the main welding path, an amount of energy applied by the laser beam in an area in a neighborhood of the turning point on a vertically upper side is designed to be larger than an amount of energy applied by the laser beam in an area in a neighborhood of the turning point on a vertically lower side.

7 Claims, 9 Drawing Sheets

(58) Field of Classification Search
USPC .................................................. 219/121.64
See application file for complete search history.

(56) References Cited

U.S. PATENT DOCUMENTS

2016/0354867 A1* 12/2016 Matsuoka .......... B23K 26/0876
2018/0071866 A1* 3/2018 Aoki .................... B23K 26/082
2019/0221989 A1* 7/2019 Sierra ............... H01S 3/094076

* cited by examiner

WELDING METHOD

CROSS-REFERENCE TO RELATED APPLICATIONS

This application claims the benefit of Japanese Patent Application No. 2018-197703 filed on Oct. 19, 2018 with the Japan Patent Office, the entire disclosure of which is incorporated herein by reference.

BACKGROUND

The present disclosure relates to a welding method.

A method is known for irradiating welding-target metal members with a laser beam to thereby weld the metal members together (see Published Japanese Translation of PCT International Patent Application No. 2005-527383). Such laser welding is also used to weld two overlapping metal plates.

SUMMARY

In a case where the two metal plates are arranged in an inclined manner with respect to a horizontal plane and also where an interspace between the two metal plates when overlapped is large, a conventional welding method may fail to sufficiently fill the interspace between the metal plates with molten metal, resulting in the risk of poor welding.

It is desirable that one aspect of the present disclosure provide a welding method enabling enhancement of quality of welding between an upper plate and a lower plate arranged in an inclined manner.

One aspect of the present disclosure is a welding method comprising welding an upper plate and a lower plate overlapped with the upper plate by irradiating a surface of the upper plate with a laser beam. The welding comprises forming a main welding path that intersects a welding advancing direction and that comprises turning points. The upper plate and the lower plate are arranged in an inclined manner with respect to a horizontal plane when viewed parallel to the welding advancing direction. In the forming the main welding path, an amount of energy applied by the laser beam in an area in a neighborhood of the turning point on a vertically upper side is designed to be larger than an amount of energy applied by the laser beam in an area in a neighborhood of the turning point on a vertically lower side.

In such a configuration, a larger amount of energy is applied in the neighborhood of the turning point on the vertically upper side, where the molten metal is liable to run down, than in the neighborhood of the turning point on the vertically lower side. This enables reduction of occurrence of excessive melting in the neighborhood of the turning point on the vertically lower side, and also enables compensation for insufficiency of the molten metal in the neighborhood of the turning point on the vertically upper side. As a result, the welding quality can be enhanced. In addition, the inclined arrangement of the upper plate and the lower plate can increase the design margin of products and jigs.

In one aspect of the present disclosure, in the forming the main welding path, a welding speed in the area in the neighborhood of the turning point on the vertically upper side may be designed to be lower than a welding speed in the area in the neighborhood of the turning point on the vertically lower side. Such a configuration enables easy and reliable adjustment of the amount of energy in the neighborhood of the turning points.

In one aspect of the present disclosure, in the forming the main welding path, movement of the laser beam may be stopped for a specified period of time in the area in the neighborhood of the turning point on the vertically upper side while irradiation with the laser beam is continued. Such a configuration enables easy and reliable reduction of the welding speed in the neighborhood of the turning point on the vertically upper side.

In one aspect of the present disclosure, the welding may further comprise stopping irradiation with the laser beam after formation of the main welding path and then performing re-irradiation. Such a configuration enables slow cooling at the end point of welding. As a result, occurrence of solidification cracking at the end point of welding can be reduced.

In one aspect of the present disclosure, the welding may further comprise forming an auxiliary welding path that is continuous and comprises a reciprocating or circling path, prior to the forming the main welding path. Such a configuration makes it possible to generate the molten metal in the auxiliary welding path to supply the molten metal to the main welding path. This can reduce generation of a gap due to insufficiency of the molten metal in the main welding path.

In one aspect of the present disclosure, the auxiliary welding path may have a circular shape. Such a configuration facilitates formation of a chamber for the molten metal, thus enabling the molten metal to be supplied to the main welding path easily and reliably.

In one aspect of the present disclosure, the main welding path may comprise: an initial region continuous from the auxiliary welding path; and a subsequent region that is provided on a more forward side of the welding advancing direction than the initial region and that has a larger turnaround pitch than the initial region. Such a configuration makes it possible to effectively utilize the molten metal in the neighborhood of the start point of the main welding path, and also to seek reduction of time for forming the main welding path.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

1. First Embodiment

1-1. Configuration

A welding method of the present embodiment comprises a welding process of welding an upper plate and a lower plate overlapped with the upper plate by irradiating a surface of the upper plate with a laser beam.

Figure 1:
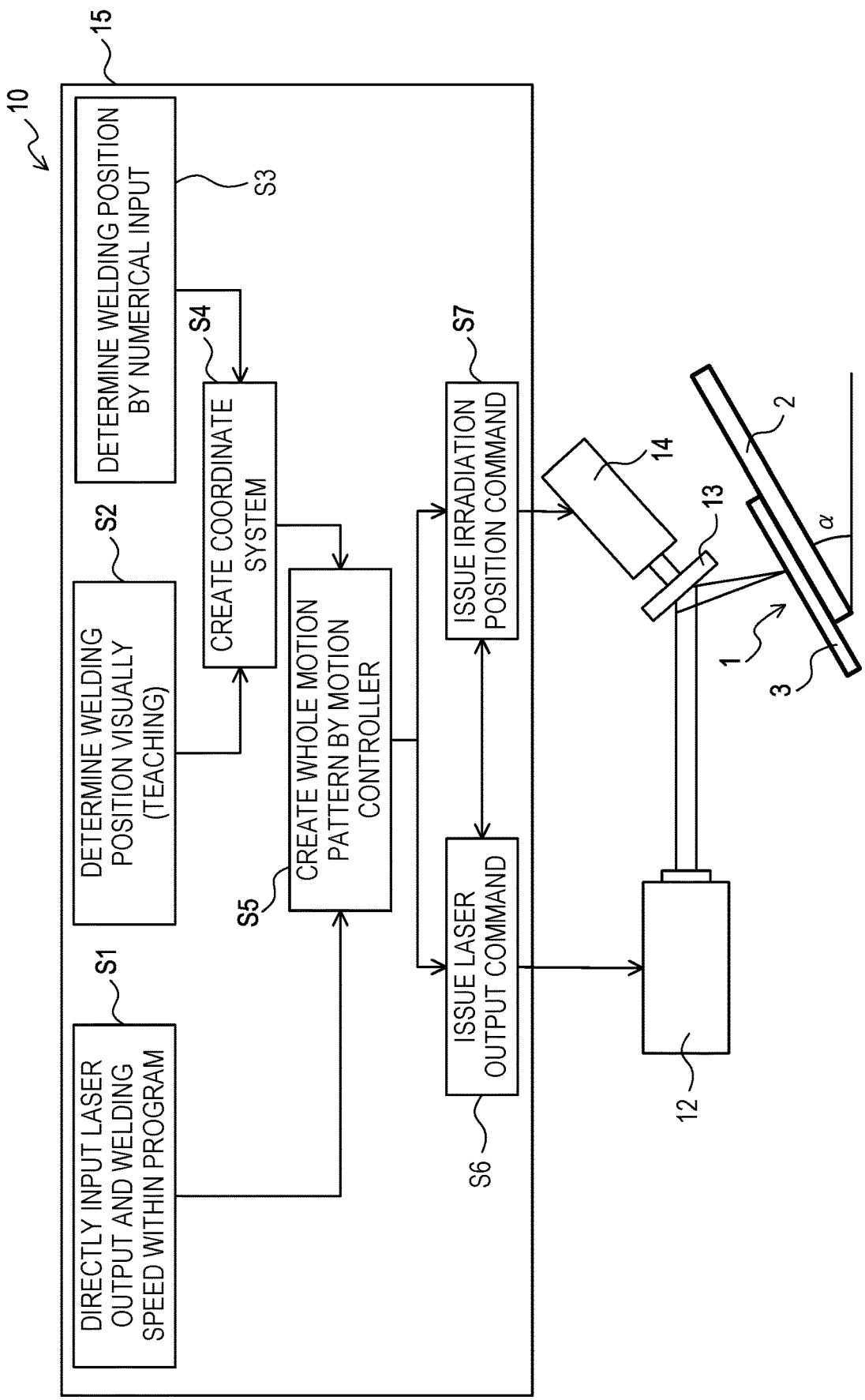
FIG. 1 is a flow and block diagram of a welding apparatus used in a welding method of an embodiment.

In the welding method of the present embodiment, welding is performed using a welding apparatus 10 shown in FIG. 1. The welding apparatus 10 comprises an oscillator 12, a mirror 13, a motor 14, and a controller 15.

In the welding method of the present embodiment, an upper plate 3 and a lower plate 2 are arranged in an inclined manner with respect to a horizontal plane when viewed parallel to a welding advancing direction (i.e., a direction normal to the paper of FIG. 1). Specifically, the upper plate 3 and the lower plate 2 are rotated away from a horizontal plane about a roll axis parallel to the welding advancing direction. An angle of inclination (i.e., a roll angle) α of the upper plate 3 and the lower plate 2 with respect to the horizontal plane is more than 0° and less than 90°.

The oscillator 12 generates a laser beam that applies energy to an upper surface of the upper plate 3 (i.e., a base material surface) overlapped with the lower plate 2. Examples of a usable source of supply of the laser beam may include carbon dioxide gas ($CO_2$). The mirror 13 redirects a path of the laser beam generated by the oscillator 12, and irradiates the surface of the upper plate 3 with the laser beam. The motor 14 is mounted to the mirror 13, and is configured to change an angle of the mirror 13.

The controller 15 adjusts an irradiation position and an amount of energy of the laser beam on the surface of the upper plate 3. Specifically, the controller 15 adjusts the irradiation position of the laser beam by changing the angle of the mirror 13 via the motor 14. Also, the controller 15 adjusts the amount of energy of the laser beam by varying output of the oscillator 12.

A specific procedure for adjusting the welding apparatus 10 will be described below. As shown in FIG. 1, firstly, an operator inputs a laser output (laser power output target value) and a welding speed directly into the welding apparatus 10 within a program (step S1).

In parallel with the step S1, the operator may determine a welding position visually and teaches it to the welding apparatus 10, to thereby automatically generate a welding position within the program (step S2). Also, the operator may determine (generate) the welding position by numerical input (step S3).

The controller 15 creates a coordinate system (step S4) based on the inputs performed in the step S2 and/or the step S3. It is also possible to choose and execute only either one of the step S2 or the step S3.

Based on the input in the step S1 (i.e., the laser output and the welding speed) and the coordinate system created in the step S4, the controller 15 creates a motion pattern of the welding apparatus 10 as a whole by means of a motion controller (step S5).

The controller 15 issues a laser output command to the oscillator 12 based on the motion pattern created in the step S5 (step S6). Also, the controller 15 issues an irradiation position command to a processing head comprising the mirror 13 and the motor 14 (step S7). The step S6 and the step S7 are linked to each other.

<Weld Structure>

Figure 2A:
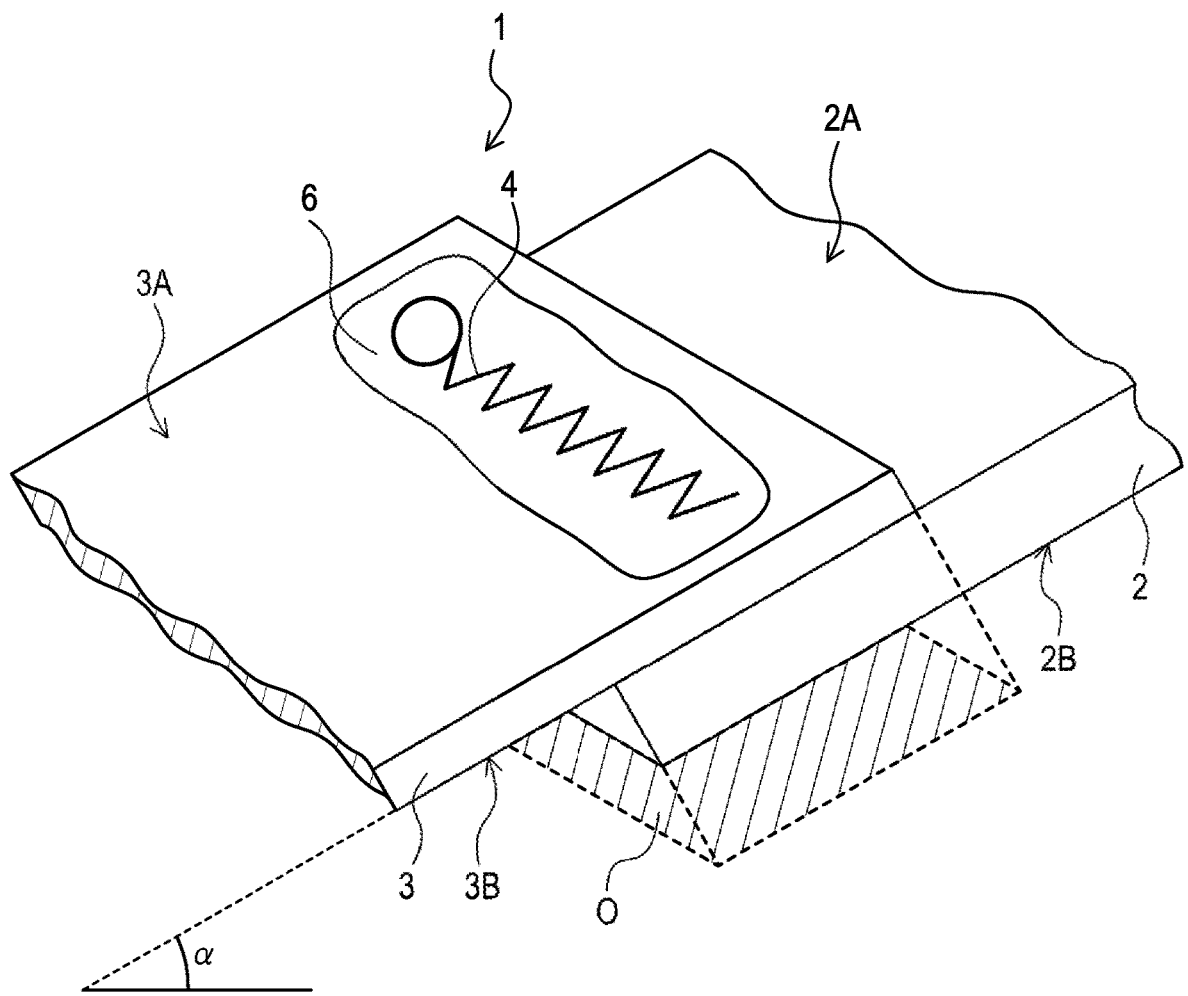
FIG. 2A is a schematic perspective view of a welded portion in the welding method in FIG. 1.

The welding by the welding apparatus 10 results in obtaining a weld structure 1 shown in FIG. 2A. The weld structure 1 is a structure with two metal plates welded together in a thickness direction thereof. The weld structure 1 comprises the lower plate 2 (including a first surface 2A that is an upper surface of the lower plate 2, and including a second surface 2B that is a lower surface of the lower plate 2), the upper plate 3 (including a third surface 3A that is an upper surface of the upper plate 3, and including a fourth surface 3B that is a lower surface of the upper plate 3), a main welding portion 4, and a welding bead 6.

Application of the weld structure 1 is not limited in particular as long as metal plates are to be welded together. The weld structure 1 can be used suitably for, for example, bracket mounting structures for automobile parts, such as an instrument panel reinforcement.

Examples of materials of the lower plate 2 may include iron, iron alloy such as steel, aluminum, or aluminum alloy. The thickness of the lower plate 2 is not limited in particular. Examples of materials of the upper plate 3 may include those listed as the materials of the lower plate 2. The materials of the upper plate 3 and the lower plate 2 may be identical to each other or may be different from each other.

A portion of the upper plate 3 is overlapped with the first surface 2A of the lower plate 2 (an upper surface in FIG. 2A). The upper plate 3 may be a thin plate having an average thickness of 1 mm or smaller in an overlapping area O where it is overlapped with the lower plate 2. The upper plate 3 may be entirely overlapped with the lower plate 2. The average thickness of the upper plate 3 not in the overlapping area O may be larger than 1 mm.

Figure 2B:
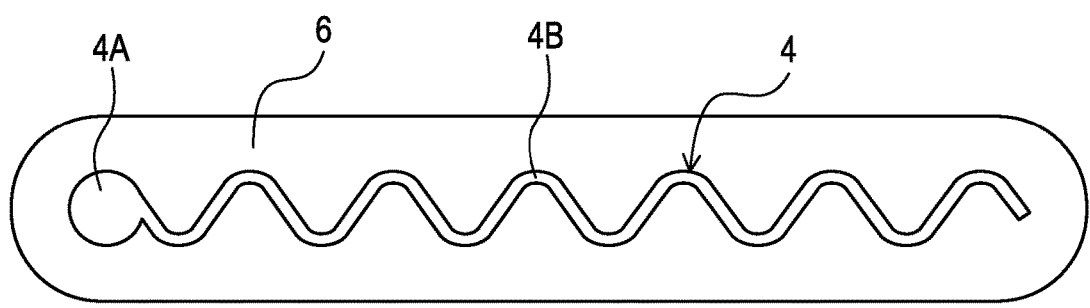
FIG. 2B is a schematic diagram of the welded portion in the welding method in FIG. 1.

In a welded portion, the main welding portion 4 is a portion where the metals constituting the lower plate 2 and the upper plate 3 have been melted and solidified due to heat input by the laser beam. The welding bead 6 is formed around the main welding portion 4. As shown in FIG. 2B, the main welding portion 4 comprises a circular part 4A and a waved part 4B.

Figure 3A:
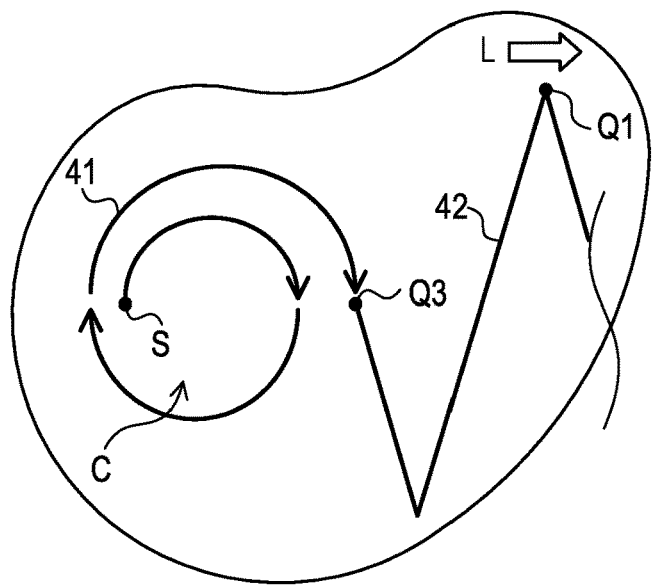
FIG. 3A is a schematic diagram of an auxiliary welding path.

The circular part 4A in the main welding portion 4 is created by an auxiliary welding path 41 of the laser beam shown in FIG. 3A. The waved part 4B of the main welding portion 4 is created by a main welding path 42 of the laser beam.

The welding process in the welding method of the present embodiment comprises an auxiliary welding path forming process for forming the auxiliary welding path 41, a main welding path forming process for forming the main welding path 42, and a re-irradiation process for stopping irradiation with the laser beam after formation of the main welding path 42 and then performing re-irradiation.

<Auxiliary Welding Path Forming Process>

In this process, formed prior to the main welding path forming process is the auxiliary welding path 41, which is continuous and comprises a reciprocating or circling path, or a plurality of the auxiliary welding paths 41. In the present embodiment, as shown in FIG. 3A, the auxiliary welding path 41 with a circular shape, which is a circling path, is formed. The "circular shape" is a concept including an approximately spiral shape with its diameter reduced or enlarged along a circumferential direction.

For example, the auxiliary welding path 41 with a circular shape is formed by firstly depicting a semicircle with a specified diameter from a start point S of irradiation with the laser beam along a welding advancing direction L, secondly depicting a semicircle with a slightly larger diameter toward the start point S, and then depicting a semicircle with an even larger diameter along the welding advancing direction L.

Occurrence of blowholes can be reduced by arranging the circling path in a non-overlapping manner as described above. Further, formation of the path into the circular shape facilitates formation of a chamber C for molten metal. Thus, the molten metal can be suitably supplied to the main welding path 42.

Figure 3B:
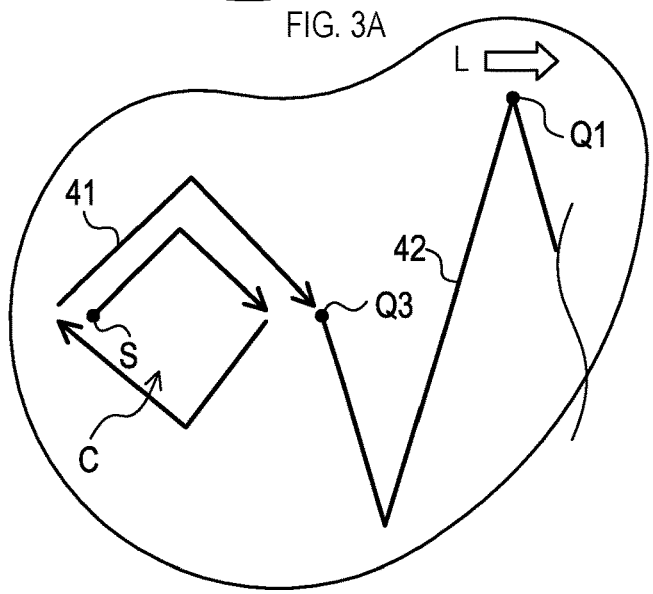
FIG. 3B is a schematic diagram of an auxiliary welding path of an embodiment other than shown in FIG. 3A.

As shown in FIG. 3B, the auxiliary welding path 41 may have an approximately rectangular shape (created from line segments).

Alternatively, the auxiliary welding path 41 may have a polygonal shape other than the rectangular shape. Furthermore, the auxiliary welding path 41 may be a linear path reciprocating in specified directions.

<Main Welding Path Forming Process>

In this process, formed after the formation of the auxiliary welding path 41 is the main welding path 42 that intersects the welding advancing direction L and that comprises multiple turning points.

Figure 3C:
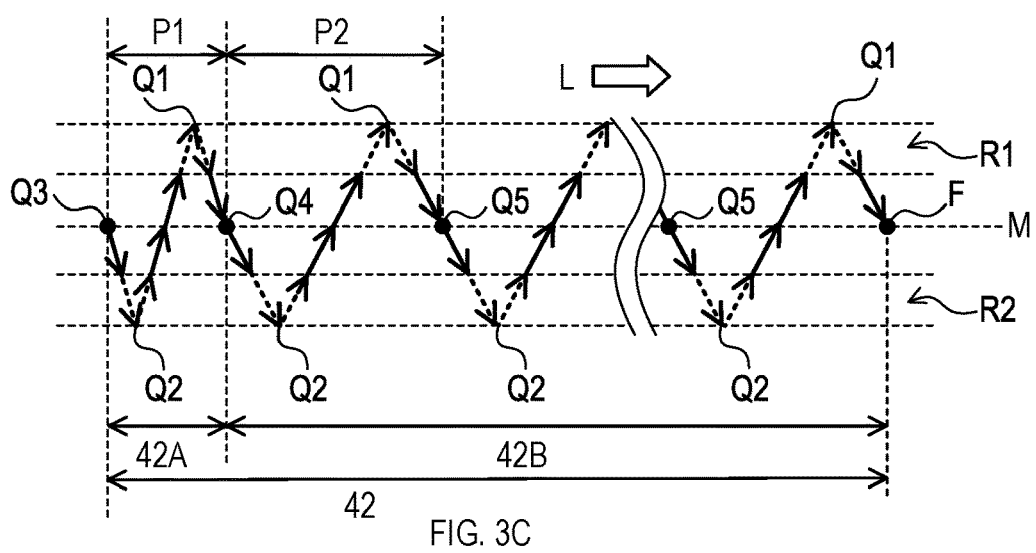
FIG. 3C is a schematic diagram of a main welding path.

As shown in FIG. 3A, a start point of the main welding path 42 is an end point Q3 of the auxiliary welding path 41. That is, the main welding path 42 is formed continuously with the auxiliary welding path 41. As shown in FIG. 3C, the main welding path 42 is configured to turn around in directions intersecting the welding advancing direction L so as to cross a center line M parallel to the welding advancing direction L.

In the present embodiment, the main welding path 42 has a triangular waveform. The main welding path 42 having a shape in which it turns around gently at the tops of the triangular waveforms or having a sinusoidal waveform may also be adopted.

The main welding path 42 is formed by irradiating the third surface 3A of the upper plate 3 (an upper surface in FIG. 2A), which is on an opposite side from the lower plate 2, with the laser beam while weaving it with respect to the welding advancing direction L.

The main welding path 42 comprises an initial region 42A continuous from the auxiliary welding path 41 and a subsequent region 42B provided on a more forward side of the welding advancing direction L than the initial region 42A. A subsequent turnaround pitch P2 in the subsequent region 42B is larger than an initial turnaround pitch P1 in the initial region 42A.

Here, the "turnaround pitch" means the length in the welding advancing direction L of one cycle (i.e., one wavelength) of the path in each region. Specifically, the turnaround pitch is a distance between two farthermost intersections from among three adjacent intersections where the path in each region intersects the center line M.

As described above, the initial turnaround pitch P1 in the initial region 42A is smaller than the subsequent turnaround pitch P2 in the subsequent region 42B. As shown in FIG. 3A, this reduces a distance between the chamber C for the molten metal and a turning point Q1 (an initial turning point) on a vertically upper side of the main welding path 42. As a result, supply of the molten metal from the chamber C to the turning point Q1 is facilitated. In addition, the auxiliary welding path 41 and the initial region 42A may be integrally formed (not separated by a gap).

In the present embodiment, the main welding path 42 in the initial region 42A has a length of one cycle including the initial turning points Q1 and Q2. That is, the length of the initial region 42A in the welding advancing direction L is equal to the initial turnaround pitch P1 in the initial region 42A.

The main welding path 42 in the subsequent region 42B has multiple cycles. The subsequent region 42B is a region extending from an end point Q4 in the initial region 42A to a finish point F of welding. In the present embodiment, the length of the subsequent region 42B in the welding advancing direction L is an integral multiple of the subsequent turnaround pitch P2 in the subsequent region 42B.

In the present embodiment, an amount of energy applied by the laser beam in an area R1 in the neighborhood of the turning point Q1 on the vertically upper side is designed to be larger than an amount of energy applied by the laser beam in an area R2 in the neighborhood of the turning point Q2 on a vertically lower side.

Specifically, the welding speed in the area R1 in the neighborhood of the turning point Q1 on the vertically upper side is designed to be lower than the welding speed in the area R2 in the neighborhood of the turning point Q2 on the vertically lower side. In other words, irradiation time of the laser beam in the area R1 in the neighborhood of the turning point Q1 on the vertically upper side is designed to be longer than irradiation time of the laser beam in the area R2 in the neighborhood of the turning point Q2 on the vertically lower side.

Figure 4:
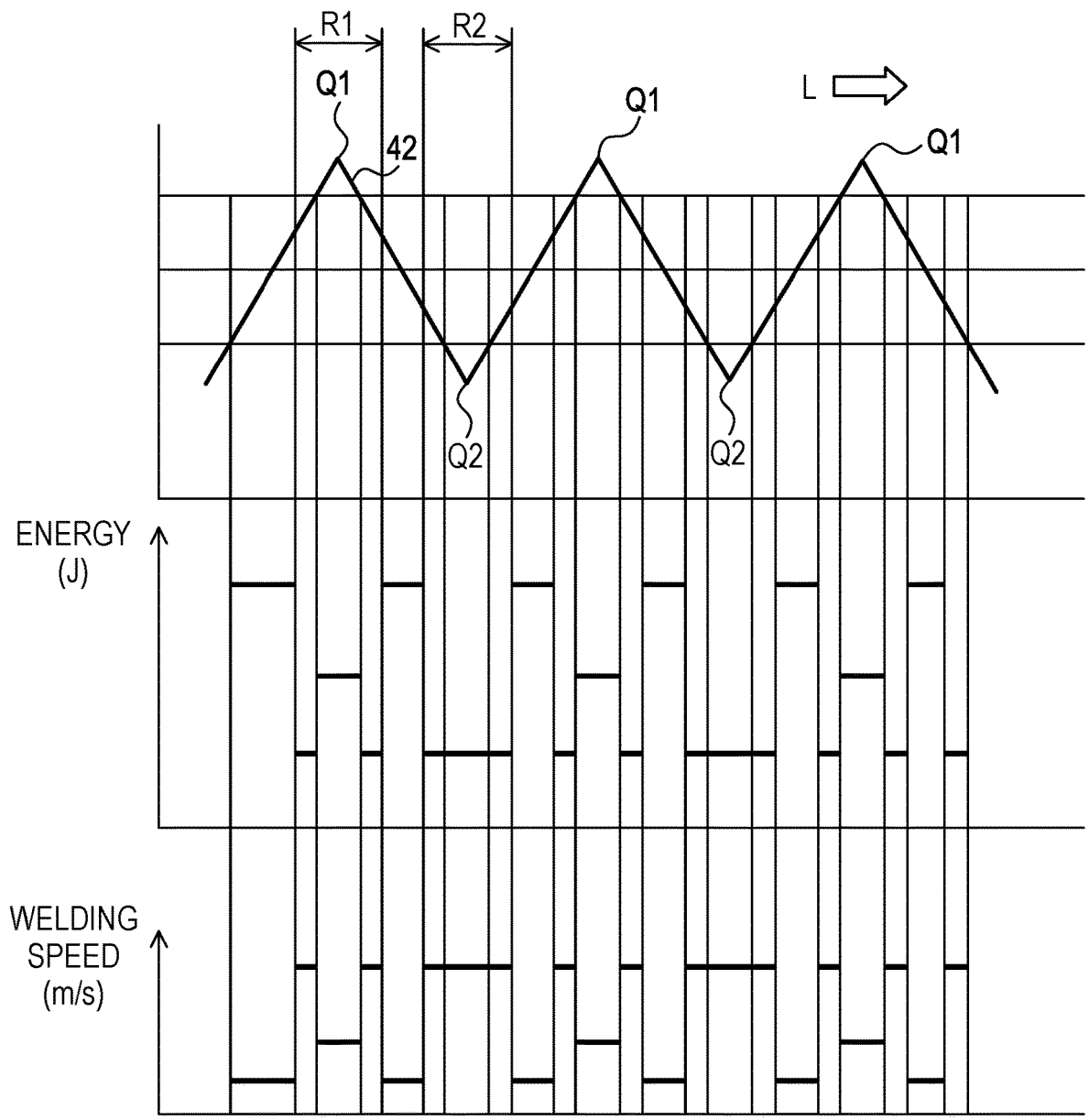
FIG. 4 is a schematic diagram showing relationships between a welding advancing direction and an energy level or a welding speed.

As shown in FIG. 4, this makes the amount of energy applied in the neighborhood of the turning point Q1 on the vertically upper side of the main welding path 42 larger than the amount of energy applied to the turning point Q2 on the vertically lower side.

As a means for varying the welding speed in the neighborhood of each turning point as above, a timer can be used. Specifically, the welding speed in the area R1 in the neighborhood of the turning point Q1 on the vertically upper side can be lowered than the welding speed in the area R2 in the neighborhood of the turning point Q2 on the vertically lower side by stopping movement of the laser beam for a specified period of time in the area R1 in the neighborhood of the turning point Q1 on the vertically upper side while irradiation with the laser beam is continued.

The period of time in which the laser beam is stopped using the timer may be set to, for example, 0.01 second or longer and 1 second or shorter. Output of the laser beam may be varied while movement of the laser beam is stopped.

Further, in the present embodiment, the amount of energy applied in the areas R1 and R2 in the neighborhood of the turning points Q1 and Q2, respectively, is smaller than the amount of energy applied in areas not in the neighborhood of the turning point Q1 or Q2. This can reduce occurrence of hole opening due to excessive penetration at the turning points Q1 and Q2.

Specifically, as shown in FIG. 4, the welding speed in the area R1 in the neighborhood of the turning point Q1 on the vertically upper side and the welding speed in the area R2 in the neighborhood of the turning point Q2 on the vertically lower side are designed to be higher than the welding speed in areas other than the areas R1 and R2.

<Re-Irradiation Process>

In this process, irradiation with the laser beam is stopped at the finish point F of welding, and then, re-irradiation with the laser beam is applied to the finish point F.

An interval between the stop of irradiation and the re-irradiation may be set to, for example, 0.05 second or longer and 2 seconds or shorter. The period of time for re-irradiation may be set to, for example, 0.05 second or longer and 2 seconds or shorter.

Output of the laser beam at the time of the re-irradiation may be varied from the output during the welding (i.e., during formation of the main welding path 42) by, for example, defocusing or the like. However, it is preferable to set the same output as that during the welding.

Figure 5:
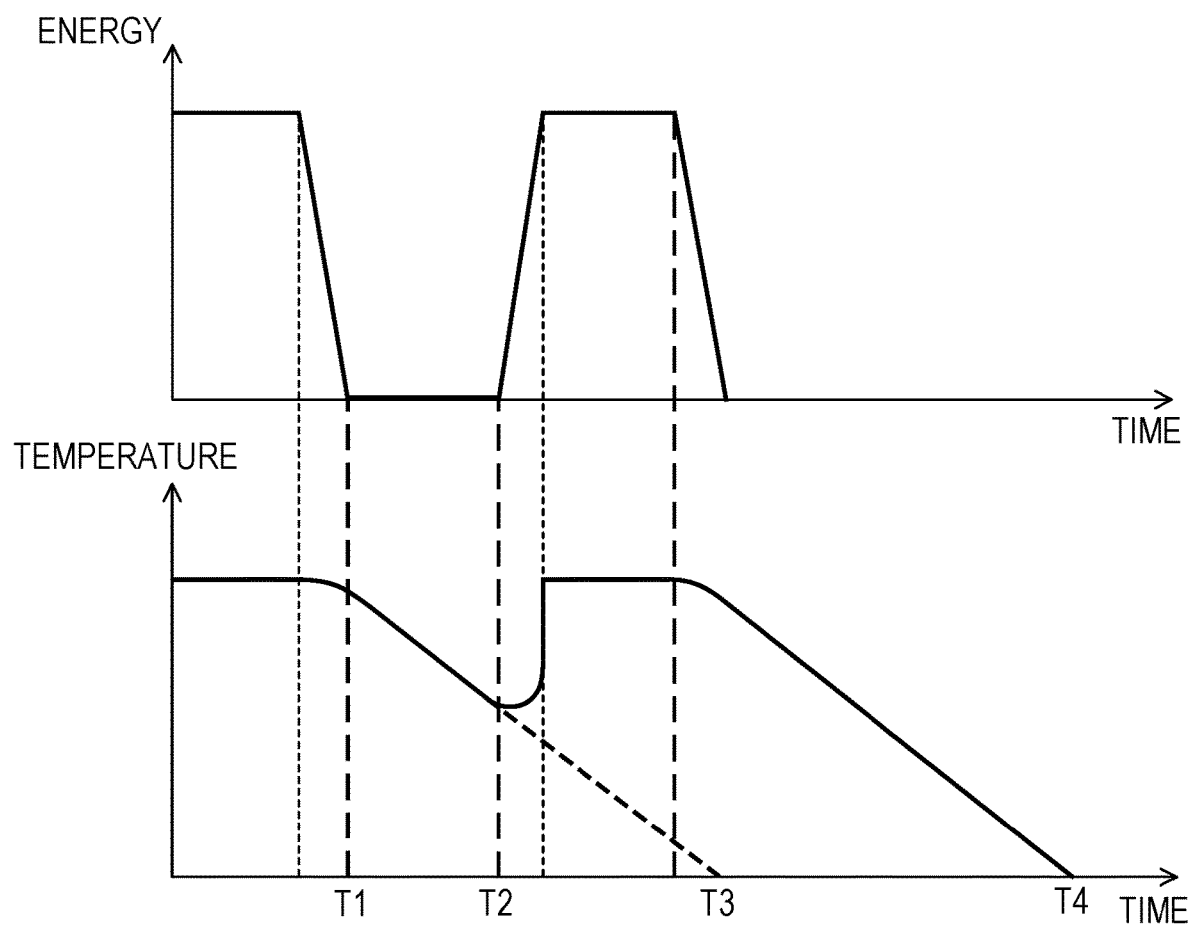
FIG. 5 is a schematic diagram showing relationships between time and an energy level or a temperature at the end of welding.

As shown in FIG. 5, irradiation with the laser beam is stopped at a time T1 and re-irradiation is performed at a time T2, thus extending a time period for cooling at the finish point F and delaying the end of the time period from a time T3 to a time T4. That is, the finish point F is allowed to cool slowly, and thus, occurrence of solidification cracking is reduced.

<Control>

A process that the welding apparatus 10 performs to achieve the welding method of the present embodiment will be described below with reference to a flow chart in FIG. 6.

Figure 7:
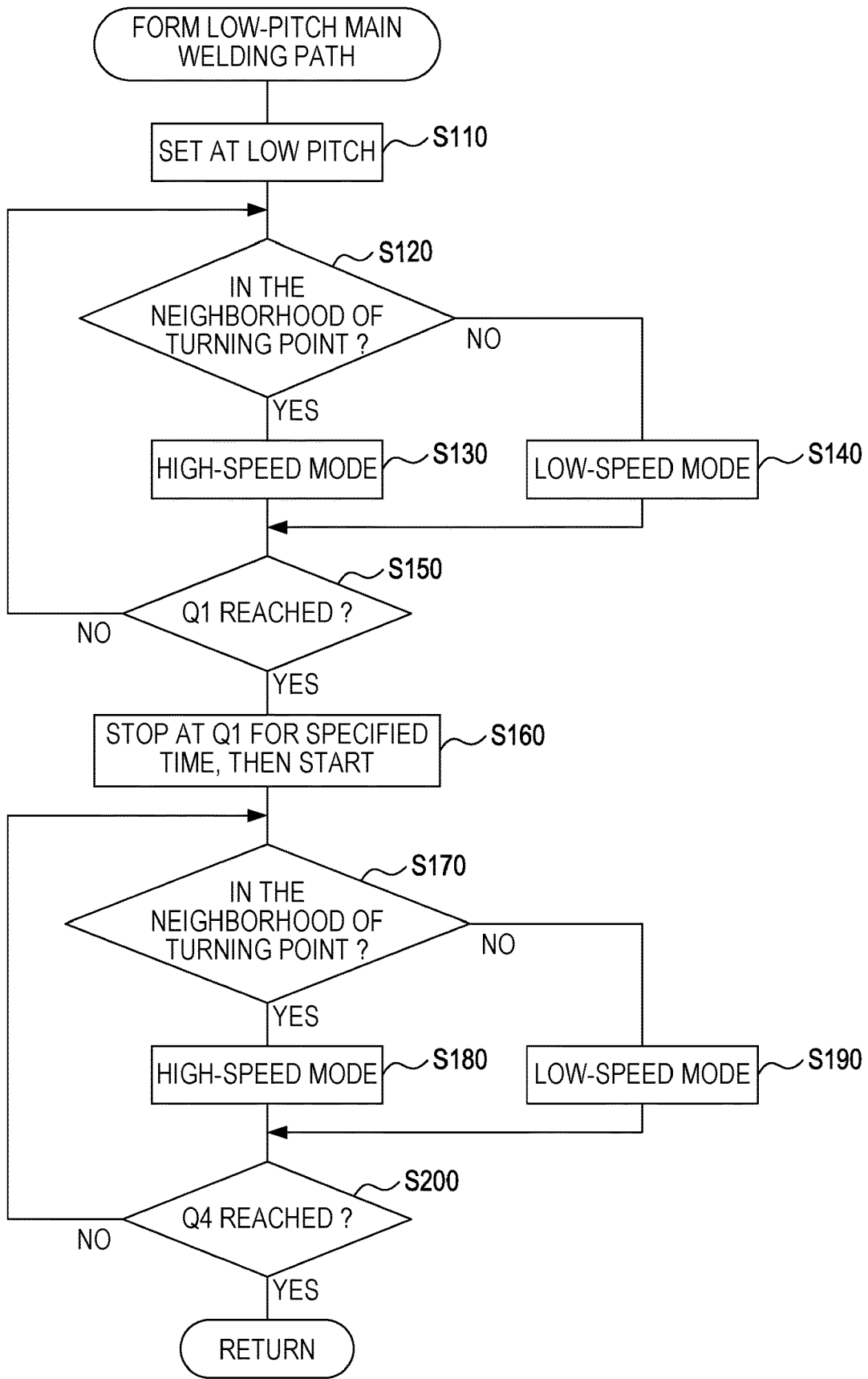
FIG. 7 is a flow chart of a low-pitch main welding path forming process.

Firstly, the welding apparatus 10 forms the auxiliary welding path 41 by using the oscillator 12 and the motor 14 (step S10). After forming the auxiliary welding path 41, the welding apparatus 10 performs a low-pitch main welding path forming process in FIG. 7 (step S20).

In the low-pitch main welding path forming process, the welding apparatus 10 firstly sets a welding pitch at a low pitch (i.e., the initial turnaround pitch P1 in the initial region 42A) (step S110).

Next, the welding apparatus 10 locates the current irradiation position, and determines whether the current irradiation position is in the neighborhood of the turning point Q1 or Q2 (step S120). If the current irradiation position is in the neighborhood of the turning point Q1 or Q2 (S120: YES), the welding apparatus 10 issues a command to switch the welding speed to a high-speed mode or a command to keep the high-speed mode (step S130).

Contrarily, if the current irradiation position is not in the neighborhood of the turning point Q1 or Q2 (S120: NO), the welding apparatus 10 issues a command to shift the welding speed to a low-speed mode or a command to keep the low-speed mode (step S140).

The welding apparatus 10 repeatedly performs control of the welding speed until the irradiation position reaches the turning point Q1 (step S150). After the irradiation position reaches the turning point Q1, the welding apparatus 10 stops at the turning point Q1 for a specified period of time using the timer while continuing irradiation with the laser beam (step S160).

Upon lapse of the specified period of time, the welding apparatus 10 determines again whether the current irradiation position is in the neighborhood of the turning point Q1 or Q2 while welding at low pitch (step S170), and performs shifting between the high-speed mode (step S180) and the low-speed mode (step S190). When the irradiation position reaches the end point Q4 of the initial region 42A, the welding apparatus 10 ends the low-pitch main welding path forming process (step S200).

Figure 8:
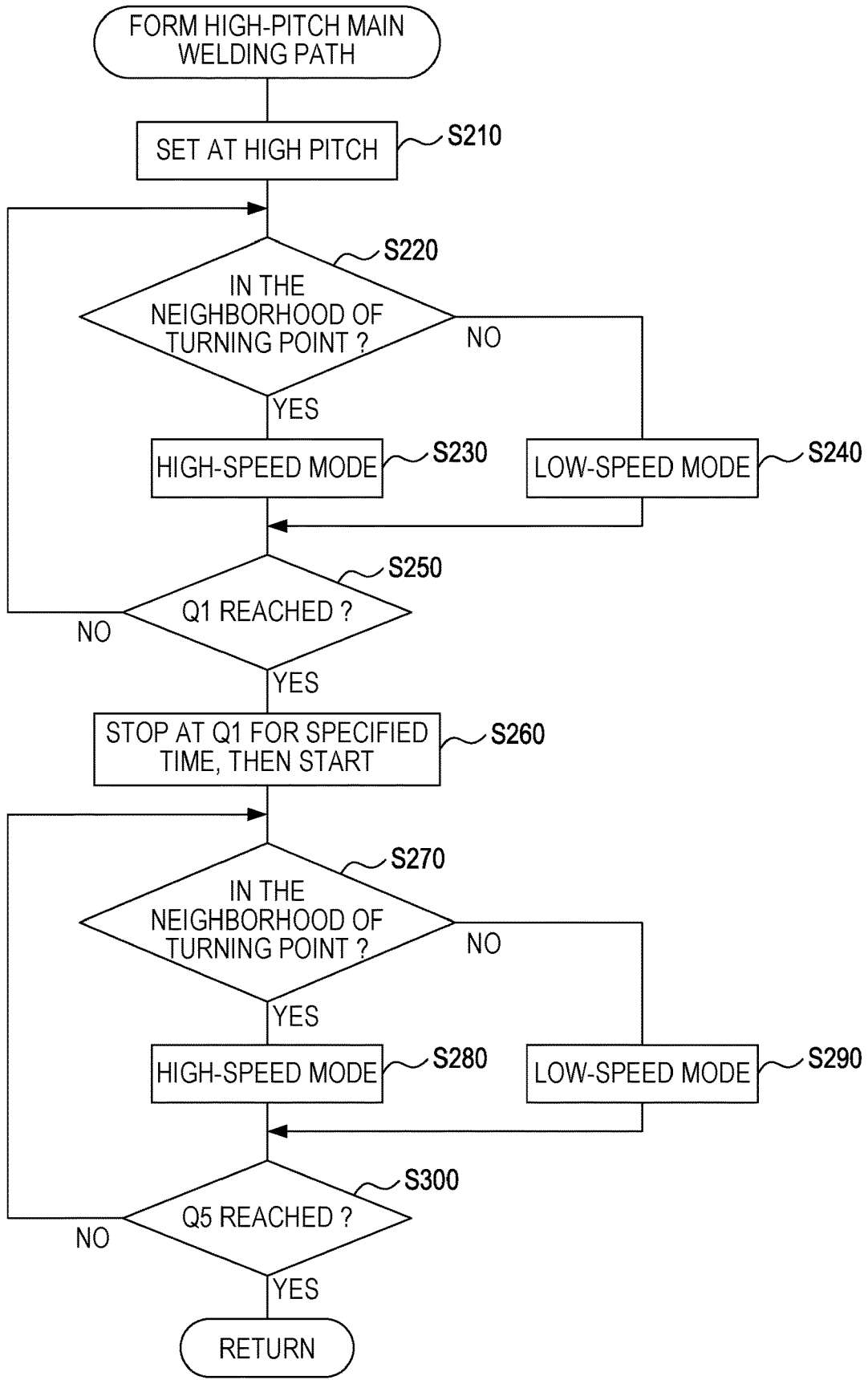
FIG. 8 is a flow chart of a high-pitch main welding path forming process.

After completion of the low-pitch main welding path forming process, the welding apparatus 10 performs a high-pitch main welding path forming process in FIG. 8 (step S30).

In the high-pitch main welding path forming process, the welding apparatus 10 firstly sets the welding pitch at a high pitch (i.e., the subsequent turnaround pitch P2 in the subsequent region 42B) (step S210).

Next, the welding apparatus 10 locates the current irradiation position, and determines whether the current irradiation position is in the neighborhood of the turning point Q1 or Q2 (step S220). If the current irradiation position is in the neighborhood of the turning point Q1 or Q2 (S220: YES), the welding apparatus 10 issues a command to shift the welding speed to a high-speed mode or a command to keep the high-speed mode (step S230).

Contrarily, if the current irradiation position is not in the neighborhood of the turning point Q1 or Q2 (S220: NO), the welding apparatus 10 issues a command to shift the welding speed to a low-speed mode or a command to keep the low-speed mode (step S240).

The welding apparatus 10 repeatedly performs control of the welding speed until the irradiation position reaches the turning point Q1 (step S250). After the irradiation position reaches the turning point Q1, the welding apparatus 10 stops at the turning point Q1 for a specified period of time using the timer while continuing irradiation with the laser beam (step S260).

Upon lapse of the specified period of time, the welding apparatus 10 determines again whether the current irradiation position is in the neighborhood of the turning point Q1 or Q2 while welding at high pitch (step S270), and performs shifting between the high-speed mode (step S280) and the low-speed mode (step S290). When the irradiation position reaches an end point Q5 for each cycle of the main welding path 42, the welding apparatus 10 ends the high-pitch main welding path forming process (step S300).

Figure 6:
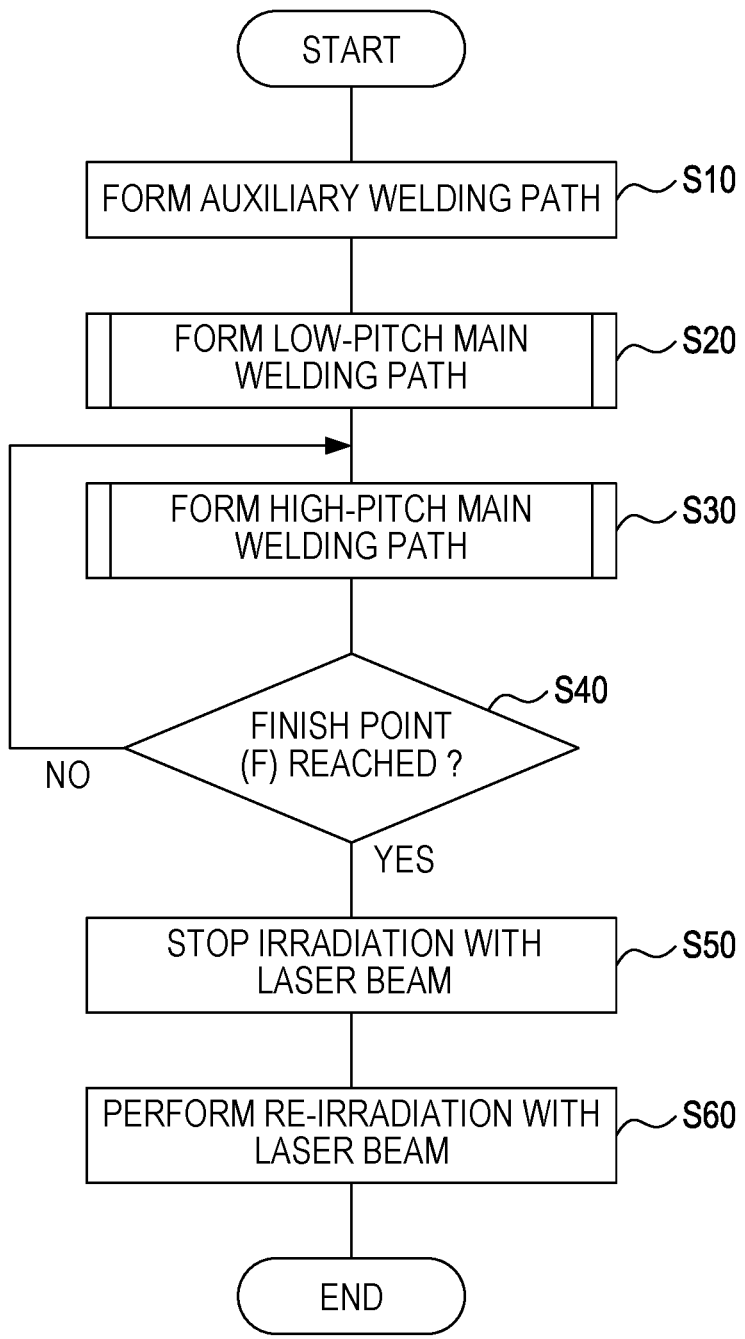
FIG. 6 is a flow chart of the welding method of the embodiment.

After completion of each cycle of the high-pitch main welding path forming process, the welding apparatus 10 determines whether the irradiation position reaches the finish point F of welding (step S40 in FIG. 6). If the irradiation position does not reach the finish point F (S40: NO), the welding apparatus 10 repeats the high-pitch main welding path forming process.

If the irradiation position reaches the finish point F (S40: YES), the welding apparatus 10 stops irradiation with the laser beam (step S50). Upon lapse of a specified period of time, the welding apparatus 10 performs re-irradiation with the laser beam (step S60).

<Cross-Section of Weld Structure>

Figure 9:
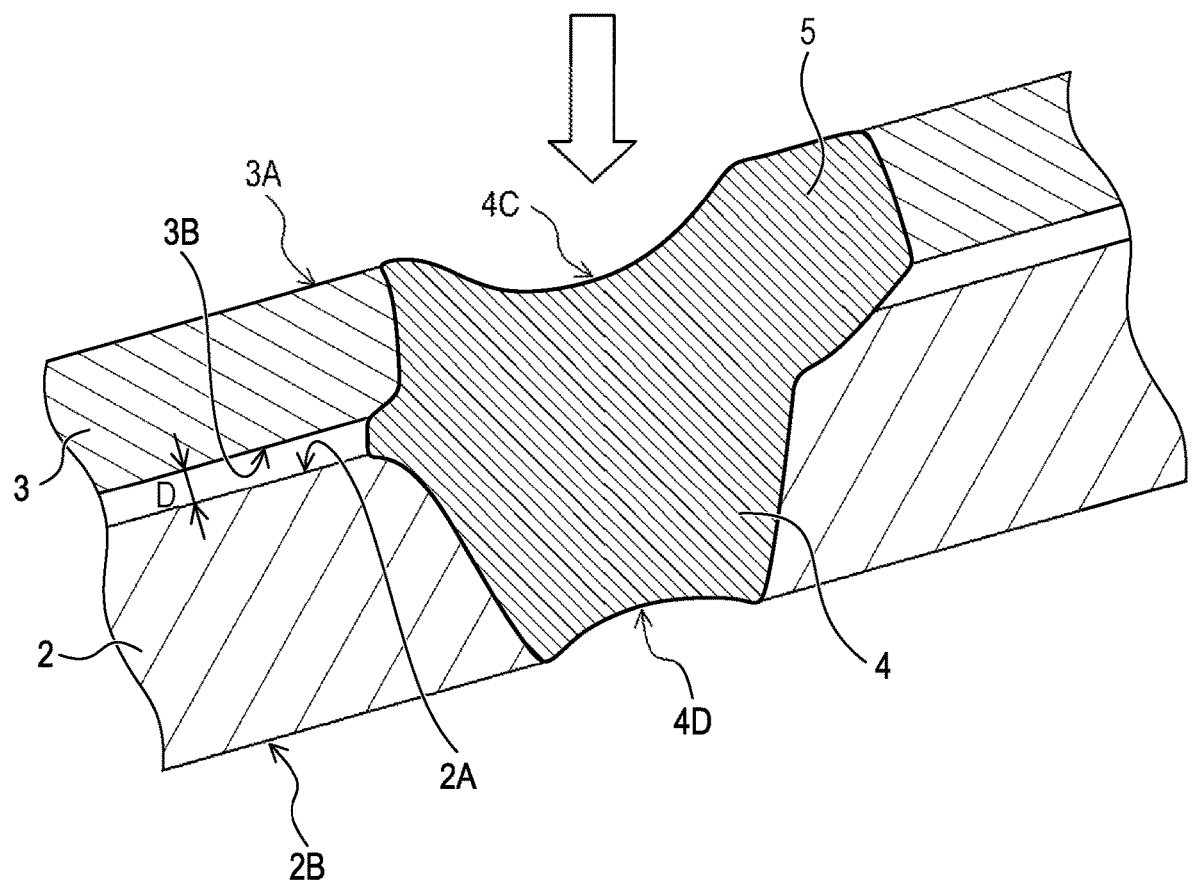
FIG. 9 is a schematic sectional view of the welded portion.

A cross-section of the weld structure obtained by the welding method of the present embodiment is shown in FIG. 9. FIG. 9 illustrates the weld structure welded in an inclined state where the right side thereof in FIG. 9 is positioned upper in the vertical direction. The outline arrow in the drawing indicates a direction of irradiation with the laser beam.

In the weld structure in FIG. 9, no voids (i.e., blowholes) are present within the main welding portion 4. Molten metal 5 constituting the main welding portion 4 is formed more on the vertically upper side than on the vertically lower side. In other words, a larger amount of the molten metal is generated on the vertically upper side so as to compensate for the molten metal that runs down by gravity.

The molten metal 5 penetrates the upper plate 3, and reaches the inside of the lower plate 2 and then the second surface 2B (a lower surface in FIG. 9), which is on an opposite side from the upper plate 3. The upper plate 3 and the lower plate 2 are welded together in the thickness direction thereof via the main welding portion 4 welded on an inner surface of the upper plate 3 and on an inner surface of the lower plate 2.

The third surface 3A (i.e., a welding surface) of the upper plate 3, which is on an opposite side from the lower plate 2, and an (upper) exposed surface 4C of the main welding portion 4 in the upper plate 3 are continuous. That is, in the cross-section perpendicular to a longitudinal direction (i.e., the welding advancing direction) of the main welding portion 4, there are no steps in the thickness direction at connections between the upper plate 3 and the main welding portion 4. The longitudinal direction of the main welding portion 4 is a weaving advancing direction (i.e., a direction parallel to a line connecting the centers in the weaving).

The (upper) exposed surface 4C of the main welding portion 4 is curved in a concave shape recessed in the thickness direction of the upper plate 3. In other words, the exposed surface 4C is like a bridge between two ends on the third surface 3A of the upper plate 3, which are spaced apart by the molten metal 5, and smoothly connects these ends to each other.

As shown in FIG. 9, the main welding portion 4 within the upper plate 3 increases in width from the third surface 3A of the upper plate 3 toward an inner side in the thickness direction (i.e., as getting closer to the lower plate 2). However, such increase in width of the main welding portion 4 within the upper plate 3 is not essential.

Also, the width of the main welding portion 4 within the lower plate 2 decreases in width from the first surface 2A of the lower plate 2 toward an outer side in the thickness direction (i.e., as spaced apart from the upper plate 3). A bottom surface 4D of the main welding portion 4 exposed from the lower plate 2 has a smaller width in a direction perpendicular to the thickness direction than the exposed surface 4C of the main welding portion 4 in the upper plate 3.

As shown in FIG. 9, there exists an interspace D in an overlapping direction between the fourth surface 3B of the upper plate 3 (a lower surface in FIG. 9), which faces the lower plate 2, and the first surface 2A of the lower plate 2. If this interspace D is too large, it is feared that the weld strength may be insufficient. The interspace D between the upper plate 3 and the lower plate 2 does not necessarily have to exist.

1-2. Effects

The above-detailed embodiment provides effects below.

(1a) A larger amount of energy is applied in the neighborhood of the turning point Q1 on the vertically upper side, where the molten metal is liable to run down, than in the neighborhood of the turning point Q2 on the vertically lower side. This enables reduction of occurrence of excessive melting in the neighborhood of the turning point Q2 on the vertically lower side, and also enables compensation for insufficiency of the molten metal in the neighborhood of the turning point Q1 on the vertically upper side. As a result, the welding quality can be enhanced. In addition, the inclined arrangement of the upper plate 3 and the lower plate 2 can increase the design margin of products and jigs.

(1b) Movement of the laser beam is stopped for the specified period of time in the area R1 in the neighborhood of the turning point Q1 on the vertically upper side while irradiation with the laser beam is continued. This decreases the welding speed in the neighborhood of the turning point Q1 on the vertically upper side, thus enabling easy and reliable adjustment of the amount of energy in the neighborhood of the turning points Q1 and Q2.

(1c) Irradiation with the laser beam is stopped at the end point of welding, and then re-irradiation is performed. This enables slow cooling at the end point of welding. As a result, occurrence of solidification cracking at the end point of welding can be reduced.

(1d) The molten metal is generated in the auxiliary welding path 41, and the molten metal can be supplied to the main welding path 42. This can reduce generation of a gap due to insufficiency of the molten metal in the main welding path 42.

(1e) The main welding path 42 comprises the initial region 42A and the subsequent region 42B having the larger turnaround pitch than the initial region 42A. This makes it possible to effectively utilize the molten metal in the neighborhood of the start point of the main welding path 42, and also to seek reduction of time for the process of forming the main welding path 42.

2. Other Embodiments

The embodiment of the present disclosure has been described so far; however, the present disclosure is not limited to the aforementioned embodiment and can take various forms.

(2a) In the welding method of the aforementioned embodiment, the amount of energy applied in the neighborhood of the turning point Q1 on the vertically upper side may be designed to be larger than the amount of energy applied in the neighborhood of the turning point Q2 on the vertically lower side by controlling the output of the laser beam or the focus of the laser beam, instead of the welding speed or in combination with the welding speed.

In adjusting the welding speed at the turning point Q1, movement of the laser beam does not necessarily have to be stopped for the specified period of time. Specifically, the welding speed at the turning point Q1 may be adjusted by a control decreasing the welding speed.

Furthermore, instead of designing the amount of energy applied in the area R1 in the neighborhood of the turning point Q1 on the vertically upper side to be larger than the amount of energy applied in the other areas, the amount of energy applied in the area R2 in the neighborhood of the turning point Q2 on the vertically lower side may be designed to be smaller than the amount of energy applied in the other areas.

(2b) In the welding method of the aforementioned embodiment, the main welding path 42 does not necessarily have to comprise the initial region 42A and the subsequent region 42B. Specifically, the turnaround pitch of the main welding path 42 may be constant.

(2c) In the welding method of the aforementioned embodiment, the auxiliary welding path forming process is not an essential process. Thus, welding may be started from the start point of the main welding path 42. Further, the re-irradiation process is also not an essential process and thus may be omitted.

(2d) In the welding method of the aforementioned embodiment, the amount of energy applied in the areas R1 and R2 in the neighborhood of the turning points Q1 and Q2, respectively, does not necessarily have to be smaller than the amount of energy applied in the areas other than in the neighborhood of the turning points Q1 and Q2.

(2e) The function(s) performed by a single element in the aforementioned embodiments may be performed by multiple elements. The function(s) performed by multiple elements may be performed by a single element. Part of the configuration of the aforementioned embodiments may be omitted. At least part of the configuration of the aforementioned embodiments may be added to or replaced by the configuration of the aforementioned other embodiments. All modes included in the technical idea specified by recitations in the accompanying claims are embodiments of the present disclosure.

What is claimed is:

1. A welding method comprising welding an upper plate and a lower plate overlapped with the upper plate by irradiating a surface of the upper plate with a laser beam, the welding comprising:
   forming a main welding path that intersects a welding advancing direction and that comprises turning points; and
   forming an auxiliary welding path, which is continuous and comprises a reciprocating or circling path, prior to the forming the main welding path,
   the upper plate and the lower plate being arranged in an inclined manner with respect to a horizontal plane when viewed parallel to the welding advancing direction, and
   in the forming the main welding path, an amount of energy applied by the laser beam in an area in a neighborhood of at least one of the turning points on a vertically upper side being designed to be larger than an amount of energy applied by the laser beam in an area in a neighborhood of at least one of the turning points on a vertically lower side,
   wherein the main welding path comprises:
      an initial region continuous from the auxiliary welding path; and
      a subsequent region that is provided on a more forward side of the welding advancing direction than the initial region and that has a larger turnaround pitch along the welding advancing direction than the initial region.

2. The welding method according to claim 1,
   wherein, in the forming the main welding path, a welding speed in the area in the neighborhood of at least one of the turning points on the vertically upper side is designed to be lower than a welding speed in the area in the neighborhood of at least one of the turning points on the vertically lower side.

3. The welding method according to claim 2,
   wherein, in the forming the main welding path, movement of the laser beam is stopped for a specified period of time in the area in the neighborhood of at least one of the turning points on the vertically upper side while irradiation with the laser beam is continued.

4. The welding method according to claim 1,
   wherein the welding further comprises stopping irradiation with the laser beam after formation of the main welding path and then performing re-irradiation.

5. The welding method according to claim 5claim 1,
   wherein the auxiliary welding path has a circular shapethe circling path.

6. The welding method according to claim 4,
   wherein output of the laser beam in the performing the re-irradiation is the same as an output of the laser beam in the forming the main welding path.

7. The welding method according to claim 1,
   wherein the welding advancing direction is linear.

* * * * *